Figure 1:
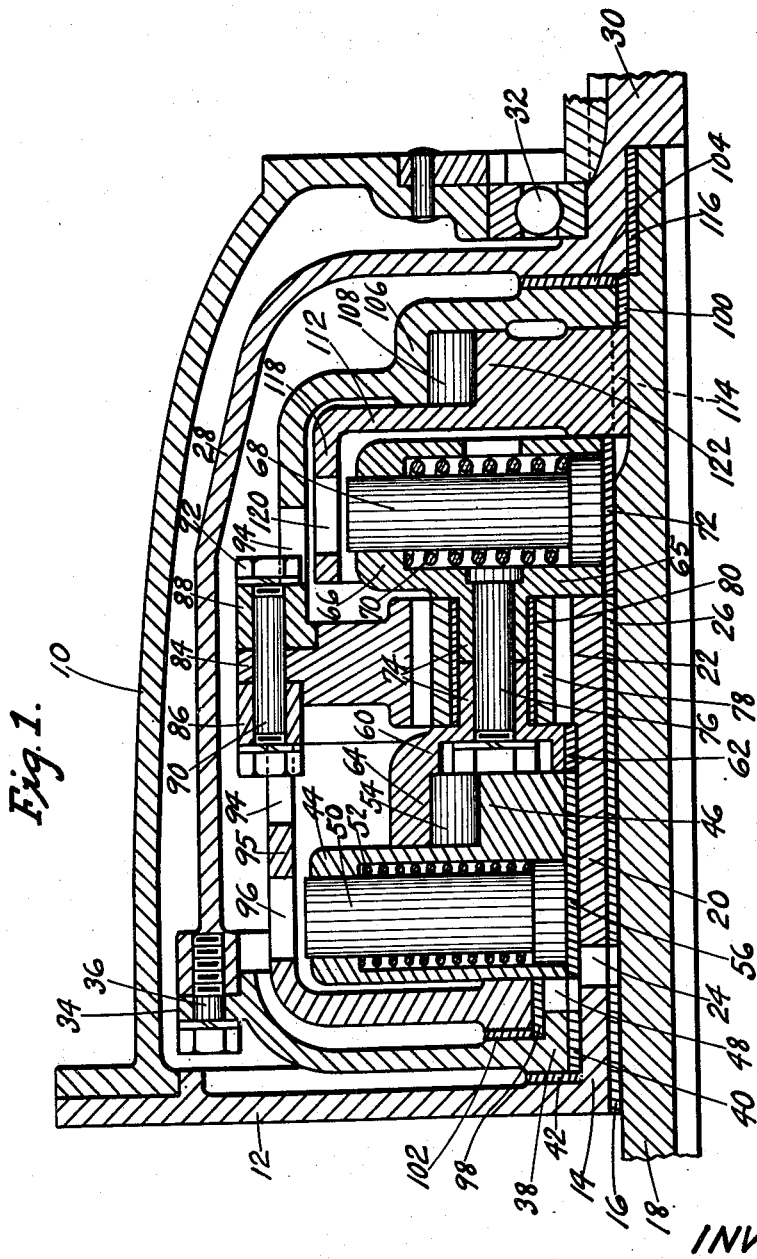

Oct. 22, 1940.  F. W. COTTERMAN  2,218,813
TRANSMISSION GEARING
Filed Aug. 28, 1939    2 Sheets-Sheet 1

INVENTOR
Frederick W. Cotterman

Oct. 22, 1940.   F. W. COTTERMAN   2,218,813
TRANSMISSION GEARING
Filed Aug. 28, 1939   2 Sheets-Sheet 2
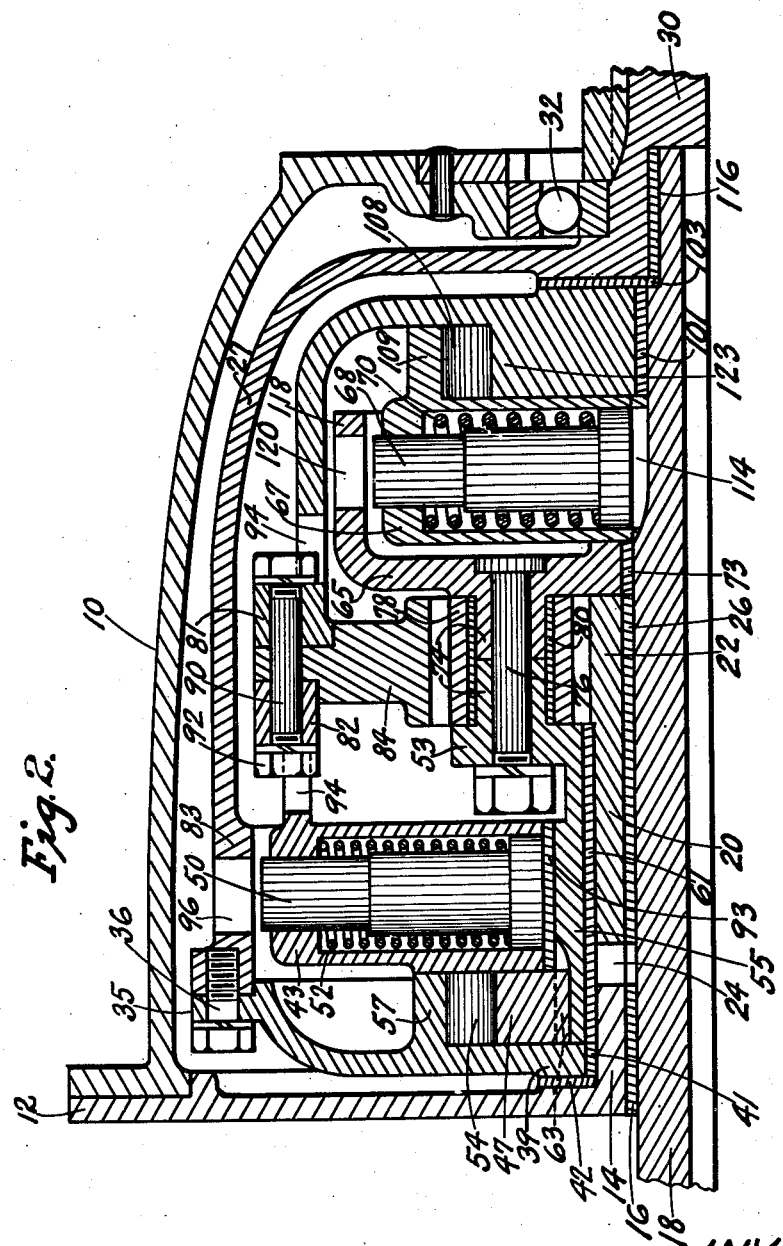
INVENTOR
Frederick W. Cotterman Patented Oct. 22, 1940

2,218,813

UNITED STATES PATENT OFFICE 2,218,813

TRANSMISSION GEARING

Frederick W. Cotterman, Dayton, Ohio, assignor of one-half to Bessie D. Apple, Dayton, Ohio Application August 28, 1939, Serial No. 292,219

25 Claims. (Cl. 74—260)

This invention relates to power transmitting devices and is particularly applicable to automotive use. The principle involved is in many respects similar to that of the transmission gear used in my copending application Serial No. 180,174, filed Dec. 16, 1937, except that in the copending application free wheeling is prevented in all speed ratios while in the present application it is prevented only in the overdrive ratio.

The present device, like that shown in the copending application mentioned is intended preferably to be used in series with a speed-torque controlled unit and with a separate reversing gear set, such for instance as the hydraulic unit and the reversing gear box in the copending application.

An object of the invention is to provide a simple and efficient arrangement wherein a single three element planetary gear set comprising a reaction gear, a carrier and its pinions, and a coaxial gear may be automatically connected variously at predetermined speeds to the input or output members to provide an underdrive, a direct drive, and an overdrive ratio.

Another object is to so construct and arrange and to so connect the several elements of the three element planetary gear set that at rest or at a relatively low speed it is connected to provide an underdrive, but, at a higher speed, by automatically making a single additional connection between two of the parts, without unmaking any connection already made, a direct drive ratio will result, and, at a still higher speed, by automatically making another single additional connection between two other of the parts, without unmaking any connection already made, an overdrive ratio will result.

Other objects and advantages will be seen as the invention is described in detail and reference is made to the drawings, wherein, Fig. 1 shows the gear set with a centrifugal device on the output member for changing from underdrive to direct drive, and a second centrifugal device on the carrier element for changing from direct to overdrive.

Fig. 2 shows the gear set with a centrifugal device on the ring gear element for changing from underdrive to direct and a second centrifugal device on the input member for changing from direct to overdrive.

Referring particularly to Fig. 1, a housing 10 is closed at the rear end but has a separate cover 12 held on by screws, not shown, for closing the front end. Cover 12 has a hub 14 provided with a bearing bushing 16 within which the front end of the input shaft 18 is runningly fitted.

The hub 20 of the sun gear 22 is end splined at 24 to the hub 14, whereby the sun gear is at all times held non-rotative. A bearing bushing 26 is press fitted into the sun gear 22 and runningly fitted to the shaft 18.

The output member comprises the output drum 28 which is provided at the rear end with the output shaft 30 rotatably supported in housing 10 by the ball bearing 32, and at the front end with a cover 34 held to the member 28 by screws 36. The cover has a hub 38 which has press fitted therein a bearing bushing 40, the bushing 40 being runningly fitted over the hub 14. A thrust washer 42 separates the covers 12 and 34.

A centrifugal weight housing 44 is end splined at 48 to the hub 38. Housing 44 is radially bored to slidably receive a weight 50 operable radially outward by centrifugal force at a predetermined speed against the resistance of a spring 52. The inner member 46 of a one way roller clutch 54 is an integral part of the housing 44. A bearing bushing 56 extends through both the housing 44 and clutch member 46, being press fitted therein and runningly fitted to the outside of the hub 20 of the sun gear 22.

Since the output shaft 30, drum 28, cover 34, hub 38, weight housing 44, weight 50, and inner clutch member 46 are all secured together for unitary rotation, these parts, as assembled in Fig. 1, may be referred to as the output member of that structure.

The planet pinion carrier comprises a carrier front flange 60 having a bearing bushing 62 press fitted therein, the bushing 62 being runningly fitted over the outside of the sun gear hub 20. The outer member 64 of the roller clutch 54 is made an integral part of the carrier flange 60.

The carrier rear flange 65 has integral therewith a weight housing 66 which is radially bored to slidably receive a weight 68 operable radially outward by centrifugal force at predetermined speed against the resistance of a spring 70. A bearing bushing 72 is press fitted into the flange 65 and housing 66 and runningly fitted over the shaft 18.

Hubs 74 extend toward each other from the carrier flanges 60 and 65, their ends being held together by the bolts 76 thereby forming a journal upon which the planet pinions 78 are rotatable, the pinions having press fitted therein the bearing bushings 80 which are rotatable on the journals.

Since the parts consisting of the flanges 60 and 65

65, member 64, housing 66, weight 68, hubs 74, bolts 76, and pinions 78 are all joined together for unitary rotation, these parts, when assembled as in Fig. 1, may be referred to as the carrier element of that structure.

The ring gear element comprises the ring gear 84, a front bearing head 86, and a rear bearing head 88, all held together in concentric relation by the bolts 90 and nuts 92. The heads both have openings 94 to clear the nuts 92 and the front head 86 carries the rim 95 with openings 96 to receive the outer end of the centrifugal weight 50. A bearing bushing 98 press fitted into the front head rotatably supports the front head on the hub 38, while another bearing bushing 100 press fitted into the rear head 88 rotatably supports the rear head on the shaft 18.

Thrust washers 102 and 104 limit the movement of the heads 86 and 88 respectively. The outer member 106 of a roller clutch 108 is made as an integral part of the rear ring gear bearing head 88.

Since the ring gear 84, heads 86 and 88, bolts 90, and outer clutch member 106 are all joined for unitary rotation, these parts, when assembled as in Fig. 1, may be referred to as the ring gear element of that structure.

An input member flange 112 has internal splines to fit over the external splines 114 on the input shaft 18. The inside of the output shaft 30 has press fitted therein a bearing bushing 116, the rear end of the input shaft 18 being rotatable in this bushing.

A rim 118 having an opening 120 to receive the outer end of the weight 68 is intergal with the flange 112. The inner member 122 of a one way roller clutch 108 is formed as an integral part of the input member flange 112.

Since the input shaft 18, inner clutch member 122, and input member flange 112 are secured together for unitary rotation, these parts, when assembled as in Fig. 1, may be referred to as the input member of that structure.

The roller clutch 54 is so formed that, through it, the carrier element may drive the output member forwardly but not backwardly, the roller clutch 108 being so formed that, through it, the input member may drive the ring gear forwardly but not backwardly. By forward rotation is meant clockwise when viewed from the left of the drawings.

The device Fig. 1 operates as follows:

When power at low speed is applied to the input shaft 18, the drive will be through clutch 108 to the ring gear element, to the carrier element, through clutch 54 to the output member.

Free wheeling being permitted through either clutch, there will now be no engine braking. This ratio is underdrive, the output shaft rotating at about .7 of the input.

At 15 M. P. H., or any other predetermined speed for which the weight and spring are designed, the weight 50 moves out and tries to enter the opening 96. The opening is now rotating about 30% faster than the weight. By decelerating the engine, the opening drops in speed while the vehicle momentum keeps the weight speed from falling. When the opening 96 drops in rotative speed to that of the weight 50, the weight enters the opening. The drive is now from shaft 18, through clutch 108, to the ring gear element, then through the weight 50 to the output member. The carrier now idles, transmitting no power. Free wheeling being still permitted through clutch 108, there is no engine braking.

This ratio is direct drive, the output and input shafts rotating at the same speed.

At about 35 M. P. H. or such other speed for which the weight 68 and spring 70 are designed, the weight 68 moves out and tries to enter the opening 120 which now is rotating about 30% faster than the weight. By again decelerating the engine until the opening 120 drops 30% in speed while the vehicle keeps the weight speed uniform, the weight 68 enters the opening 120. The drive is now from the shaft 18 through member 112 and weight 68 to the carrier element, to the ring gear element, and then through the weight 50 to the output member. This is overdrive ratio, wherein the input shaft rotates only .7 as fast as the output member. Both clutches 54 and 108 are now overrunning, but since the input member is directly connected to the carrier element by the weight 68, and the ring gear element is directly connected to the output member by the weight 50, there is no free wheeling, and consequently there is engine braking as long as overdrive ratio is in effect.

Referring particularly to Fig. 2, a housing 10 is closed at the rear end but has a separate cover 12 held on by screws, not shown, for closing the front end. Cover 12 has a hub 14 provided with a bearing bushing 16 within which the front end of the input shaft 18 is runningly fitted.

The hub 20 of the sun gear 22 is end splined at 24 to hub 14, whereby the sun gear is at all times held nonrotative. A bearing bushing 26 is press fitted into the sun gear 22 and runningly fitted over the shaft 18.

The output member comprises the output drum 27 which is provided at the rear end with the output shaft 30 rotatably supported in the housing 10 by the ball bearing 32, and at the front end with a cover 35 held to the member 27 by the screws 36. The cover 35 has a short hub 39 which has press fitted therein a bearing bushing 41, the bushing 41 being runningly fitted over the hub 14. The outer member 57 of a one way roller clutch 54 is an integral part of the head 35. A thrust washer 42 separates the covers 12 and 35.

Since the output shaft 30, drum 27, cover 35, and clutch member 57 are all joined together for unitary rotation, these parts, when assembled as in Fig. 2, may be referred to as the output member of that structure.

The planet pinion carrier comprises the carrier front flange 53 having a hub 55 which has a bearing bushing 61 press fitted therein, the bushing being runningly fitted over the hub 20 of the sun gear 22 and the hub 14 of the bearing head. The forward end of the hub 55 has external splines 63 to which the internal splines of the inner member 47 of the roller clutch 54 are snugly fitted.

The carrier rear flange 65 is provided interiorly with a bearing bushing 73 rotatable on the shaft 18. Hubs 74 extend toward each other from the carrier flanges 53 and 65, their ends being held together by the bolts 76, thereby forming a journal upon which the planet pinions 78 are rotatable, the pinions having press fitted therein bearing bushings 80 which are rotatable on the journals.

Since the parts consisting of the inner roller clutch member 47, hub 55, flanges 53 and 65, hubs 74, bolts 76, and pinions 78 are all connected together for unitary rotation, these parts, when assembled as in Fig. 2, may be referred to as the carrier element of that structure.

The ring gear element comprises the ring gear 84, a front bearing head 82, and a rear bearing head 81, all held together in concentric relation by the bolts 90 and nuts 92. The heads both have openings 94 to clear the nuts 92.

Formed integral with the front head 82 is the centrifugal weight housing 43 radially bored to slidably receive a weight 50 operable radially outward by centrifugal force at a predetermined speed against the resistance of a spring 52.

A bearing bushing 93 is press fitted into the housing 43 and runningly fitted over the hub 55 of the carrier flange 53. The output member drum 27 carries the rim 83 with openings 96 into which the weight 50 may enter when it moves outward under the influence of centrifugal force.

Formed integral with the rear head 81 is the inner member 123 of a one way roller clutch 108. A bearing bushing 101 is press fitted to the inside of the head 81 and runningly fitted over the shaft 18. A thrust washer 103 separates the head 81 and the output member drum 27.

Since the ring gear 84, heads 82 and 81, bolts 90, centrifugal weight housing 43, weight 50, and inner roller clutch member 123 are all connected for unitary rotation, these parts, when assembled as in Fig. 2, may be referred to as the ring gear element of that structure.

A centrifugal weight housing 67 is internally splined to fit snugly over the external splines 114 of the input shaft 18. Housing 67 is radially bored to slidably receive a weight 68 operable radially outward by centrifugal force against the resistance of a spring 70. The outer member 109 of a roller clutch 108 is an integral part of the housing 67.

Since the input shaft 18, weight housing 67, and outer roller clutch member 109 are joined for unitary rotation, these parts, when assembled as in Fig. 2, may be referred to as the input member of that structure.

The roller clutch 54 is so formed that, through it, the carrier element may drive the output member forwardly, but not backwardly, while the roller clutch 108 is so formed that through it, the input member may drive the ring gear forwardly but not backwardly. By forward rotation is meant clockwise when viewed from the left of the drawings.

The device Fig. 2 operates as follows:

When power at low speed is applied to the input shaft 18, the drive will be through the clutch 108 to the ring gear element, to the carrier element, through clutch 54 to the output member. Free wheeling being permitted through either clutch, there will now be no engine braking. This ratio is underdrive, the output shaft rotating at about .7 that of the input.

If it is desired to have the device shift out of underdrive into direct drive at about 15 M. P. H., the weight 50 and spring 52 must be so proportioned that at about 10½ M. P. H. the weight 50 will move outward and try to enter the opening 96. At about 15 M. P. H. the outward force of the weight will be about double that necessary to move out against the spring resistance. This force causes constant rubbing, between 10½ and 15 M. P. H., of the outer end of the weight 50 against the inside of the rim 83. The rim is rotating about 30% slower than the weight and therefore the weight may not enter the opening 96.

If the engine is now decelerated about 30%, the speed that the weight drops with it that amount, so that the speed of the weight 50 and opening 96 will be synchronized. The centrifugal force of the weight, in dropping 30% in speed, will be reduced by about half, but since, before deceleration, the weight had double the necessary force, then after deceleration and synchronization, it will still have force enough to enter the opening and will therefore do so.

The drive is now from shaft 18, through clutch 108 to the ring gear element, then through the weight 50 to the output member. The carrier now idles, transmitting no power. Free wheeling being still permitted through the clutch 108, there is no engine braking. This ratio is direct drive, the output and input shafts rotating at the same speed.

If it is desired to have the device shift out of direct drive into overdrive at 35 M. P. H., the weight 68 and spring 70 should be so designed that at about 24½ M. P. H., the weight 68 will move outward and try to enter the opening 120. At about 35 M. P. H. the outward force of the weight will be about double that necessary to move out against the spring resistance. This force causes constant rubbing, between 24½ and 35 M. P. H., of the outer end of the weight 68 against the inside of the rim 118. The rim is rotating about 30% faster than the weight and therefore the weight may not now enter into the opening 120.

If the engine is again decelerated about 30%, the speed of the weight drops with it that amount, so that the weight 68 and opennig 120 will be synchronized. The centrifugal force of the weight, in dropping 30% in speed, will be reduced by about half, but since, before deceleration, the weight had double the necessary force, then after deceleration and synchronization, it will still have force enough to enter the opening.

The drive is now from shaft 18 through the weight 68 to the carrier element, to the ring gear element, and through the weight 50 to the output member. This is the overdrive ratio, wherein the input shaft rotates only .7 as fast as the output. Both clutches 54 and 108 are now overrunning, but since the input member is directly connected to the carrier element by the weight 68, and the ring gear element is directly connected to the output member by the weight 50, there is no free wheeling, and consequently there is engine braking as long as overdrive is in effect.

All other things being equal, the structure in Fig. 1 is to be preferred to that in Fig. 2 because, in Fig. 1, the weights are on the members which maintain their speed constant while the openings into which the weights are to enter are decelerated for synchronization, whereas in Fig. 2 the weights are on the members which must be decelerated, which arrangement results in the long period of rubbing of the weights over their openings under considerable pressure before the weights may be decelerated for synchronization.

I claim:

1. Transmission gearing comprising, a reaction gear fixed against rotation, a second gear coaxial therewith, a planet pinion in mesh with both said gears, a planet pinion carrier, an input member, an output member, clutch means for connecting the carrier to drive the output member forwardly only, a second clutch means for connecting the coaxial gear to the output member, a third clutch means for connecting the coaxial gear to be driven forwardly only by the input member, and a fourth clutch means for connecting the carrier to the input member.

2. The structure defined in claim 1 wherein a speed responsive means becomes operative at a predetermined speed to control the second clutch means.

3. The structure defined in claim 1 wherein a speed responsive means becomes operative at a predetermined speed to control the fourth clutch means.

4. The structure defined in claim 1 wherein one speed responsive means acts at a certain speed to control the second clutch means and a second speed responsive means acts at a different speed to control the fourth clutch means.

5. The structure defined in claim 1 wherein a centrifugal means on the output member becomes operative at a predetermined speed to control the second clutch means.

6. The structure defined in claim 1 wherein a centrifugal means on the carrier becomes operative at a predetermined speed to control the fourth clutch means.

7. The structure defined in claim 1 wherein a centrifugal means on the second gear becomes operative at a predetermined speed to control the second clutch means.

8. The structure defined in claim 1 wherein a centrifugal means on the input member becomes operative at a predetermined speed to control the fourth clutch means.

9. An underdrive, direct drive and overdrive gear mechanism comprising, a reaction gear fixed against rotation in either direction, a rotatable gear coaxial therewith, a planet pinion in mesh with both said gears, a planet pinion carrier, means preventing the carrier from rotating faster but not slower than the output member, means drivably connecting the input member to the rotatable gear, connecting means normally inoperative but operable to connect the rotatable gear to drive the output member, and a second connecting means normally inoperative but operable to connect the input member to drive the carrier.

10. The structure defined in claim 9 with means whereby the first connecting means may be made operative only above a predetermined speed.

11. The structure defined in claim 9 with means whereby the second connecting means may be made operative only above a predetermined speed.

12. The structure defined in claim 9 with speed responsive means whereby the first connecting means may be made operative only after a relatively low speed is exceeded and with a second speed responsive means whereby the second connecting means may be operative only after a higher speed is exceeded.

13. The structure defined in claim 9 wherein the first normally inoperative connecting means comprises a speed responsive means carried on and rotatable with the output member and adapted to move at a predetermined speed to make connection to the rotatable gear.

14. The structure defined in claim 9 wherein the second normally inoperative connecting means comprises a speed responsive means carried on and rotatable with the carrier element and adapted to move at a predetermined speed to make connection to the input member.

15. The structure defined in claim 9 wherein the first normally inoperative connecting means comprises a speed responsive means carried on and rotatable with the rotatable gear and adapted to move at a predetermined speed to make connection to the output member.

16. The structure defined in claim 9 wherein the second normally inoperative connecting means comprises a speed responsive means carried on and rotatable with the input member and adapted to move at a predetermined speed to make connection to the carrier.

17. Planetary gearing comprising, a reaction gear fixed against rotation in either direction, a rotatable gear coaxial therewith, a planet pinion in mesh with both said gears, a planet pinion carrier, a means connecting the carrier to drive the output member thru which the output member may overrun the carrier, a means connecting the input member to drive the rotatable gear thru which the rotatable gear may overrun the input member, clutch means engageable to enable the rotatable gear to drive the output member, and a second clutch means engageable to enable the input member to drive the carrier.

18. The structure defined in claim 17 with a speed responsive device for engaging the first said clutch means.

19. The structure defined in claim 17 with a speed responsive device for engaging the second said clutch means.

20. The structure defined in claim 17 with one speed responsive device operable at a relatively low speed to engage the first said clutch means and a second speed responsive device operable at a higher speed to engage the second said clutch means.

21. The structure defined in claim 17 wherein the first clutch means comprises a spring restrained centrifugal weight carried on and rotatable in unison with the output member and operable outwardly at or above a predetermined speed to engage a portion of the rotatable gear element.

22. The structure defined in claim 17 wherein the second clutch means comprises a spring restrained centrifugal weight carried on and rotatable in unison with the carrier element and operable outwardly at or above a predetermined speed to make connection to the input member.

23. The structure defined in claim 17 wherein the first clutch means comprises a spring restrained centrifugal weight carried on and rotatable in unison with the rotatable gear element and operable outwardly at or above a predetermined speed to engage a part of the output member.

24. The structure defined in claim 17 wherein the second clutch means comprises a spring restrained centrifugal weight carried on and rotatable in unison with the input member and operable outwardly at or above a predetermined speed to engage a part of the carrier element.

25. Transmission gearing comprising, a reaction gear fixed against rotation, a second gear coaxial therewith, a planet pinion in mesh with both said gears, a planet pinion carrier, an input member, an output member, means for providing an underdrive ratio between the input and output members comprising a combination of means which connect the coaxial gear to the input member and the carrier to the output member, means for providing a direct drive between the input and output members comprising a combination of means for connecting both the input and output members to the coaxial gear, and means for providing an overdrive ratio between the input and output members comprising a combination of means for connecting the input member to the carrier and the output member to the coaxial gear.

FREDERICK W. COTTERMAN.